(12) United States Patent
Flosbach

(10) Patent No.: US 6,732,571 B1
(45) Date of Patent: May 11, 2004

(54) FILM LEAK DETECTOR

(75) Inventor: Rudolf Flosbach, Wipperfurth (DE)

(73) Assignee: Inficon GmbH (DE)

( * ) Notice: Subject to any disclaimer, the term of this patent is extended or adjusted under 35 U.S.C. 154(b) by 0 days.

(21) Appl. No.: 09/807,154

(22) PCT Filed: Jul. 28, 1999

(86) PCT No.: PCT/EP99/05393
§ 371 (c)(1),
(2), (4) Date: Apr. 9, 2001

(87) PCT Pub. No.: WO00/22398
PCT Pub. Date: Apr. 20, 2000

(30) Foreign Application Priority Data
Oct. 10, 1998 (DE) .......................... 198 46 800

(51) Int. Cl.⁷ ............................ G01M 3/04
(52) U.S. Cl. ................ 73/40; 73/40.7; 73/46; 340/605
(58) Field of Search ............... 73/40, 40.7, 46; 340/605

(56) References Cited

U.S. PATENT DOCUMENTS

| | | | |
|---|---|---|---|
| 3,027,753 A | 4/1962 | Harder, Jr. | |
| 3,813,923 A | 6/1974 | Pendleton | |
| 5,513,516 A * | 5/1996 | Stauffer | 73/49.2 |
| 6,189,369 B1 * | 2/2001 | Yokogi | 73/40.7 |

FOREIGN PATENT DOCUMENTS

| | | | |
|---|---|---|---|
| DE | 19524050 | 1/1997 | |
| DE | 19642099 | 4/1998 | |
| EP | 0313678 | 10/1987 | |
| JP | 07325006 | * 12/1995 | G01M/3/32 |

* cited by examiner

Primary Examiner—Hezron Williams
Assistant Examiner—André K. Jackson
(74) Attorney, Agent, or Firm—Wall Marjama & Bilinski LLP

(57) ABSTRACT

The invention relates to a film leak detector with two films (5, 6) each stretched in a frame (3, 4); in order to attain a simple and stable structuring, it is proposed that each of the frames (3, 4) is comprised of two synthetic material subframes between which the particular film (5, 6) is fastened.

6 Claims, 2 Drawing Sheets

FILM LEAK DETECTOR

BACKGROUND OF THE INVENTION

The invention relates to a film leak detector with two films each stretched in a frame. Film leak detectors of this type are known from DE-A-196 42 099.

The present invention is based on the task of structuring a film leak detector of the known type simply and stably as well as improving it with respect to its operation.

This task is solved through the measures listed in the patent claims.

BRIEF DESCRIPTION OF THE DRAWINGS

Advantages and details of the invention will be explained in conjunction with embodiment examples represented in the Figures. Therein depict.

DESCRIPTION OF THE INVENTION

Figure 1:
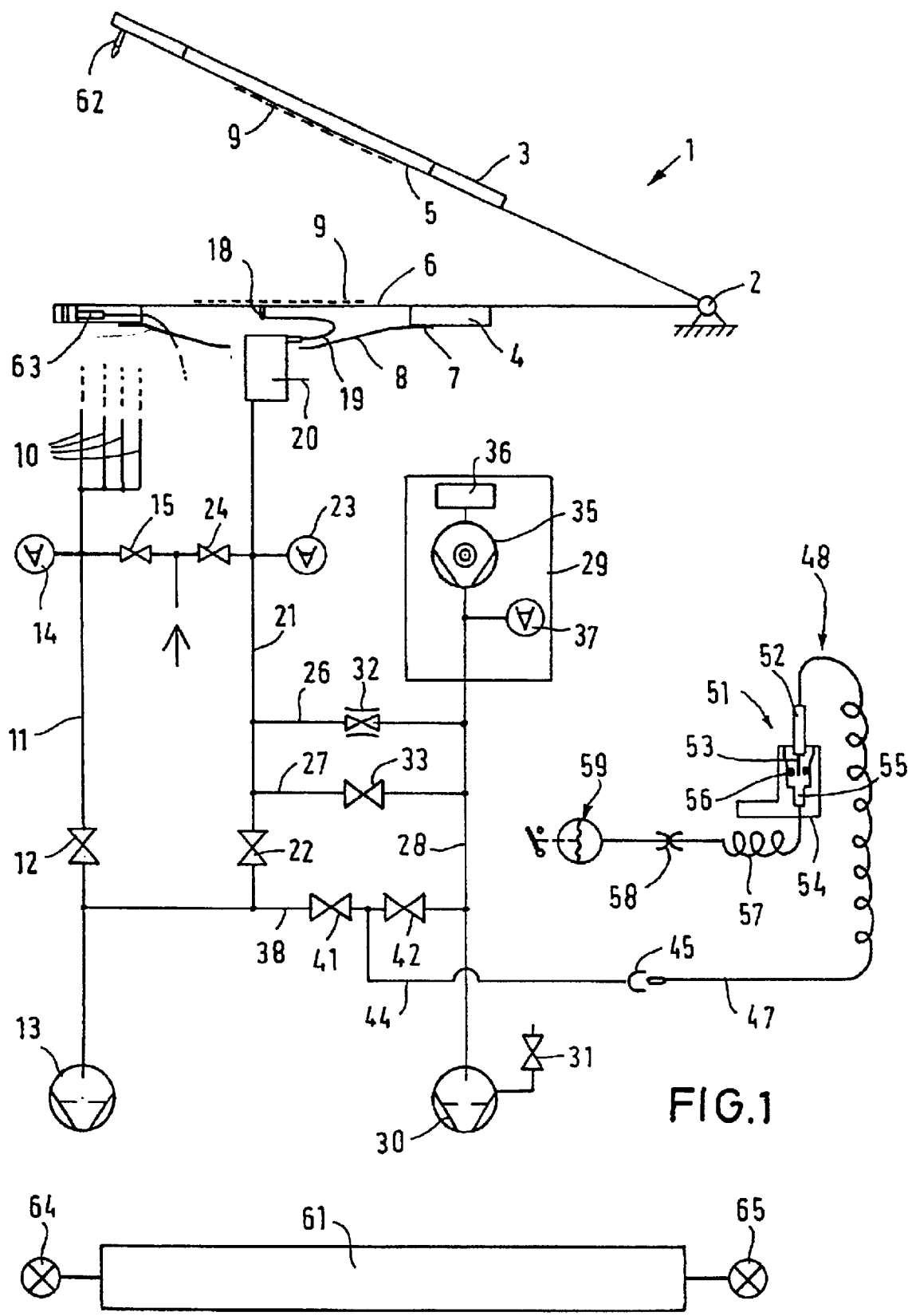
FIG. 1 schematically a film leak detector according to the invention including its circuit diagram, FIG. 2 a partial section through the frame in which the films are stretched, and further details in elevation as well as FIG. 3 a section through a detachable connection of a connection port, fastened on a film, with a line extending further.

FIG. 1 shows schematically a film leak detector 1 with its two frames 3 and 4 connected across an articulation 2 as well as films 5 and 6 stretched therein. The frames 3 and 4 are circular. The lower frame is stayed on the margin. 7 of a plate-form bottom 8, preferably comprising steel. Spunbonded web sections 9 disposed on the films 5, 6 ensure the formation of a contiguous test chamber with the test sample emplaced. The fundamental structure of a film leak detector of this type for the remainder is known from DE-A-196 42 099.

The lower frame 4 is equipped with several bores, not shown in detail, which terminate in the interior of the test chamber, which is formed by the two films 5, 6 with the test sample emplaced. Connected to these bores are line sections 10, which communicate across a common Line 11 with a valve 12 with a forevacuum pump 13. Upstream with respect to the valve 12 are additionally connected to the line 11 a pressure meter 14 and a venting valve 15.

The lower film 6 is equipped approximately in its center with a line connection 18, which is succeeded by line section 19, filter 20 and line 21 with valve 22. The line 21 is also equipped with a pressure meter 23 and with a venting valve 24.

The section of line 21, disposed between the connection of the pressure meter 23 and the valve 22, communicates across two parallel lines 26 and 27 with a line 28, which extends between the test gas detector 29 and a second forevacuum pump 30. In line 26 is disposed a choke valve 32. Line 27 is equipped with a valve 33.

The forevacuum pump 13 is usefully a single-stage "pump", the forevacuum pump 30 is developed as a two-stage "pump". Pump 30 is equipped with a gas ballast device. With valve 31 open, air (or also inert gas) streams into pump 30.

In the test gas detector 29 is disposed a turbomolecular vacuum pump 35, whose outlet communicates with line 28. To the inlet of the turbomolecular vacuum pump is connected a mass spectrometer 36. In addition, a pressure meter 37 is a component of the leak detector 29, which measures the pressure in line 28.

Downstream with respect to the valves 12 and 22, the two lines 11 and. 28 communicate across a line 38 into which the line 21 also terminates. In this line 38 between the termination of line 21 and line 28 are disposed valves 41 and 42. In the section of line 38 disposed between valves 41 and 42 terminates a line 44, which is connected with a coupling 45. The coupling 45 serves for establishing the connection of line 44 with the sniffing line 47 of a sniffer 48. The sniffing probe, denoted by 51, of the sniffer 48 comprises a handle 52 and a sniffing tip 53.

For depositing the sniffing probe a holder 54 is provided. Such is either fastened on the film leak detector 1 or developed as a separate stand. It comprises a void 55 which, when the probe 51 is deposited, contains the sniffing tip. In addition is provided a sealing ring 56 which seals the void 55 against the handle 52 when the probe 51 is deposited. Succeeding void 55 is a line 57, which communicates across a coupling 58 with an underpressure switch 59 accommodated in the housing of the film leak detector 1. As sniffing line 47 serves in known manner a capillary "tube" (diameter approximately 0.5 mm). This applies also to the line 57, in order for the underpressure generated by the sniffing tip 53 in chamber 55 to exert its effect rapidly on the underpressure switch 59.

In the film leak detector according to FIG. 1 the leak detector cycle proceeds automatically. To control the process flow, a control center is provided which is only depicted as a block 61. With it are connected all meters and all structural components to be controlled. This applies also to a switch which is actuated with the closing of the test chamber. In the embodiment example depicted this switch is a proximity switch, which comprises a metal pin 62 provided on frame 3 and a sensor 63 disposed on frame 4. The sensor 62 is connected with the control center 2. Other switches, be they operated electrically, mechanically or optically, can be applied for this purpose.

For the sake of clarity, the great number of electric connection leads between the control center 61 and the structural parts are not depicted. Connected with the control center are also two signal lights 64, 65, of which one lights up green if a test sample is detected to be impermeable and the other red if a test sample is detected to be permeable.

In the operationally ready film leak detector 1, if the test chamber—as depicted in FIG. 1—is opened or if the upper frame 3 is raised from the lower frame 4, all valves—except for valve 41—are closed. After the test sample is placed onto the lower film 6 and after the upper frame 3 is placed onto the lower frame 4, the proximity switch 62, 63 initiates a leak detection process. For this purpose, first a check takes place of whether or not an increased helium background is in the system, which could falsify leakage measurements. This takes place with the aid of the mass spectrometer 36. If it reports too high a background, valve 31 is opened and pump 30 is operated with gas ballast until the helium background has assumed a harmless value.

As a rule, an increased helium background is not present such that with the closing of the test chamber, the leak detection cycle proper also starts. First, valves 12 and 22 are opened. This causes the extremely rapid evacuation of the volume between the films 5 and 6. Outside of the regions in which the spunbonded fabric sections 9 are disposed, the films 5, 6, directly in contact with one another, form the sealing of the test chamber.

Of significance is that in the first evacuation phase only valves 12 and 22 are opened. It occurs only in this first phase that the wall/packaging of the test sample to be tested for leaks suffers a defect, for example could burst. Since in this phase connections between the test chamber and the leak detector are closed, there is no danger of helium pollution or contamination due to the product penetrating out of the test sample.

At a pressure of a few hundred mbar (100 to 300 mbar) the choke valve 32 is opened. It is dimensioned such that the necessary forevacuum pressure of the turbomolecular vacuum pump 35 does not assume impermissibly high values. With the opening of the choke valve 32 the gross leak detection starts. If helium flows through the choke valve 32, it reaches the mass spectrometer 36 in counterflow through the turbomolecular pump 35. If helium is being registered, the test sample is permeable; the leak detection cycle is terminated.

In the event helium is not yet being registered, the evacuation process is continued. If the pressure reaches a value, measured with apparatus 23, which is of the order of magnitude of the forevacuum pressure of the turbomolecular pump 35, valves 12, 22 and 32 are closed and valve 33 is opened. The phase of the sensitive leak detection starts. This is terminated if either test gas is being registered, thus the test sample is permeable, or after a specific length of time. Either a fixed time interval is preset or the test is carried out until the pressure (measured with apparatus 23) falls below a certain value. If test gas is not registered within this time, the result allows the conclusion that the test sample is impermeable.

During the sensitive leak detection phase, only lines 19, 21 and 27 represent the connection between the test chamber and the leak detector 29. Bursting of the test sample no longer needs to be anticipated. Between lines 19 and 21, for the remainder, is disposed the particle filter 20, which keeps any impurities away from leak detector 29.

Termination of the leak detection cycle takes place in such manner that all previously open valves—except for valve 41—are closed and valves 15, 24 are opened. The test chamber is vented and the upper frame 3 can be raised from the lower frame 4. It is useful if the two frames 3, 4, articulated with one another, in the proximity of the articulation 2 are under the effect of a (not shown) spring device whose force acts continuously in the direction of opening. Its force should be such that the vacuum generated during the leak detection keeps the test chamber closed and that frame 3 assumes its open position after the venting process.

If during the leak test it is found that a test sample is permeable, it is of interest to the user to locate the site of the leak. For this purpose the film leak detector according to the invention is equipped with a sniffer 48. It is connected with its sniffing line 47 to line 44 across the coupling 45.

As long as the sniffer 48 is not in use, it is deposited in a holder 54. This holder 54 is equipped with the means 55 to 59 already described, with the aid of which the control center 61 can detect whether or not probe 51 is deposited in holder 54. Other means, be they mechanically, electrically or inductively actuated switches, can also be used for this purpose.

As long as probe 51 is in holder 54, valve 41 is kept open, as has already been described. Thereby the sniffer is continuously in standby. Only when it is removed from its holder 54, does valve 41 close and valve 42 open. The gas stream penetrating sniffer 48 thereby reaches line 28 and is maintained by pump 30. In this state, sniffing leak detection is possible. If helium is picked up by the sniffing tip 53, it reaches the mass spectrometer 36 in counterflow through the turbomolecular pump 35.

The control center 61 is programmed such that switching the sniffer 48 from standby to leak detection operation (switching over valves 41 and 42) does not occur as long as the proximity switch 62, 63 is closed. The simultaneous leak detection leading to error measurements via the film leak detector 1 and via the sniffer 48 is consequently excluded.

Of interest to the visitor in the quantitative leak detection as a rule is the leakage rate of a detected leak, measured in mbar1/sec.

In the inspection of test samples produced in high production numbers, however, it is also of interest to measure the concentration of the test gas in the test sample. This can take place thereby that the sniffing tip 53 is inserted into the test sample or that the test sample is provided with a defined leak and in the film leak detector 1 a leak detection cycle is carried out. The control center is therefore developed such that on a (not shown) display the leakage rate as well as also the concentration can be read.

Figure 2:
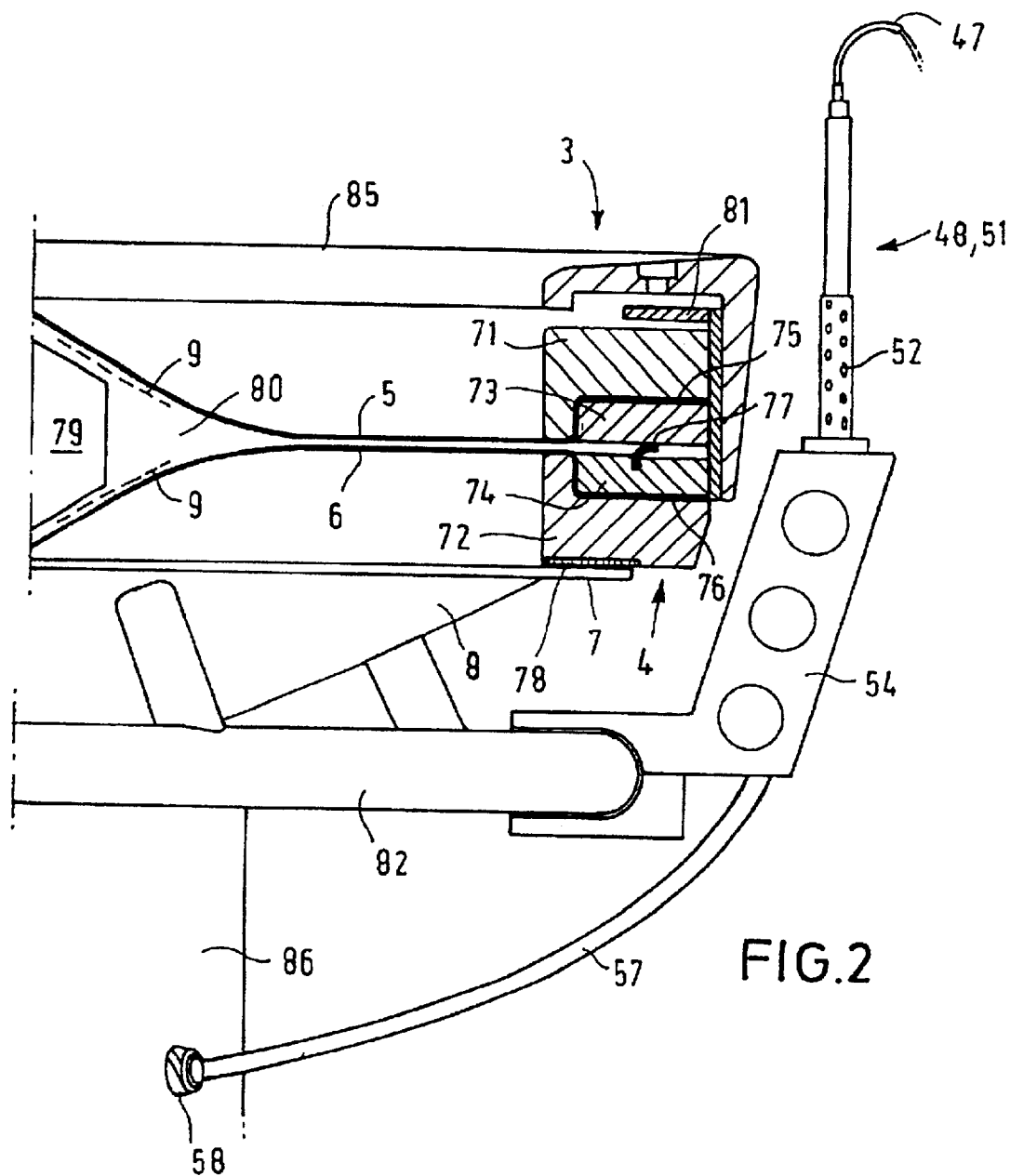

FIG. 2 shows the structure of frames 3 and 4. Each comprises an outer ring 71 or 72 and an inner ring 73, 74. Between the pairs of rings are fastened, preferably adhered, the films 5, 6. Each of the inner rings is disposed in recesses 75, 76, corresponding to one another. The recesses are disposed such that the outer rings 71, 72 in their regions facing the test chamber directly oppose one another and thereby determine the planes of the stretched films 5, 6. In the outer region the inner rings 73, 74 directly oppose one another. Between them is disposed a lip seal 77. Films 5, 6 extend through the angular gap between the particular ring pairs and are thus adhered or screw-connected all-over.

In FIG. 2 is also evident that the films 5, 6 form a test chamber 80 when a test sample 79 is placed between them. The spunbonded fabric sections 9 ensure the formation of a contiguous test chamber 80.

Ring 72 of the lower frame 4 is stayed on margin 7 of the plate-form bottom 8 and is adhered to it (adhesion layer 78). Associated with the upper frame 3 is a support, which is formed by a steel profile 81 encompassing the frame 3 from the outside and partially from above. Frame 3 is fastened on steel profile 81 so as to float in the axial direction such that, after it is lowered, it comes to rest uniformly on the entire periphery of frame 4. Through the evacuation of the test chamber 80, additionally, a pressing force is generated. In the axial direction the steel profile 81 extends downwardly beyond frame 3 and, in the last phase of the lowering movement, forms a guidance. A trim ring 85 serves for covering the steel ring 81.

FIG. 2 shows further that the depicted film leak detector is equipped with an encompassing handle 82. On it is fastened the holder 54 for the sniffer 48. In holder 54 is disposed the means, already described in connection with FIG. 2, which indicates whether or not probe 51 of the sniffer 48 is deposited on holder 54. Between holder 54 and the housing 86 extends the capillary hose 57 which is inserted into the coupling 58.

Figure 3:
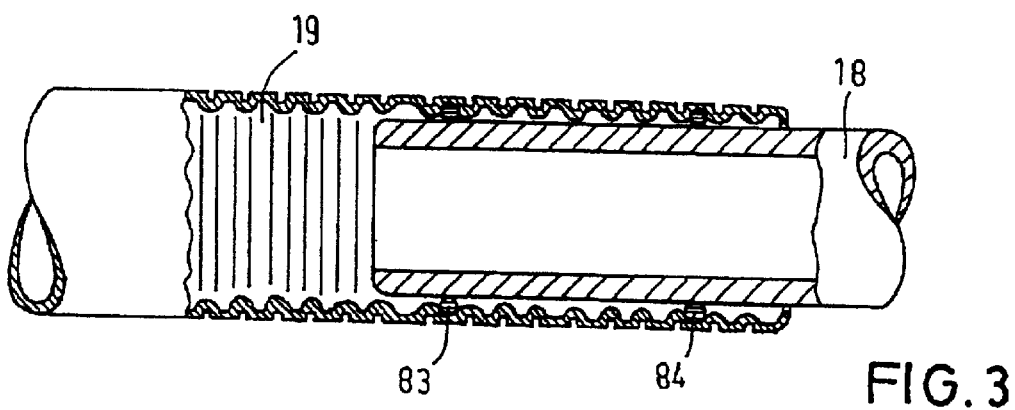

FIG. 3 shows the transition between the connection port 18 and the line section 19 extending further. Both are comprised of synthetic material, preferably polyamide. The line section 19 is developed as a corrugated tube and, together with sealing rings 83, 84, encompasses the connection port 18.

What is claimed is:

1. A frame structure for a leak detector, said frame structure comprising:
   an upper frame and a lower frame onto each of which a film is stretched thereupon, each of the upper frame and the lower frame further comprising an outer subframe and an inner subframe each made from a synthetic material between which said films are fastened wherein each outer subframe of said upper and lower frames, respectively, includes a recess having disposed therein a corresponding inner subframe thereby defining a test chamber between said upper and lower frames for an incoming test gas sample entering said defined test chamber and in which said films are at least one of adhered and screw-fastened with the frame portions onto which they are respectively stretched and in which each recess is disposed in a region of a corresponding outer subframe facing away from the test chamber and wherein one of said inner subframes is equipped with a lip seal, said lower frame being positioned onto a margin of a plate-form bottom, said upper frame including a support provided with a steel profile, said steel profile being angled and at least partially encompassing said upper frame from above and from the outside thereof, said upper frame being fastened on said steel profile so as to float axially relative to said lower frame wherein the steel profile also partially encompasses said lower frame when the defined test chamber is closed, said upper and lower frames each being circularly formed and comprised of polyamide, said upper and lower frames being connected at one end across an articulation.

2. A frame structure as claimed in claim 1, wherein the film of the lower frame is equipped with a central connection port and a line detachably coupled with said connection port.

3. A frame structure as claimed in claim 2, wherein the central connection port is a tube section made from a synthetic material.

4. A frame structure as claimed in claim 3, wherein the detachably coupled line in the region facing the central connection port is a synthetic corrugated tube encompassing said connection port when a connection is made.

5. A frame structure as claimed in claim 4, wherein the synthetic material tube section and/or corrugated tube are comprised of polyamide.

6. A frame structure as claimed in claim 1, wherein the upper and lower frames are under the effect of a spring device whose force acts continuously in the direction of opening of said upper and lower frames.

* * * * *